Oct. 15, 1940.   J. R. ALEXANDER   2,218,390
CONTROL SYSTEM
Filed Jan. 17, 1939

Inventor:
James R. Alexander,
by Harry E. Dunbar
His Attorney.

Patented Oct. 15, 1940

2,218,390

UNITED STATES PATENT OFFICE 2,218,390

CONTROL SYSTEM

James R. Alexander, Lansdowne, Pa., assignor to General Electric Company, a corporation of New York Application January 17, 1939, Serial No. 251,364

4 Claims. (Cl. 221—118)

This invention relates to control systems, more particularly to systems for effecting or varying a controlling operation of a machine or apparatus in accordance with an operating condition or characteristic of a controlling element, and it has for an object the provision of a simple, reliable, and improved control system of this character.

More specifically, the invention relates to systems for effecting or varying a controlling operation of a machine or apparatus in accordance with some operating condition or characteristic such as speed of an element or rate of feed of material. For example, one aspect of the invention relates to the control of a machine or apparatus which performs an operation on a material that is being supplied thereto, and a more specific object of the invention is the provision of means for varying the rate of feed of such material in accordance with variations in the speed, rate of feed of another material, or some other operating condition or characteristic of a control element.

In carrying the invention into effect in one form thereof, for controlling the supply of material through a device having a control member, means are provided for actuating the control member and means are provided for producing a control voltage that varies with some operating condition or characteristic of the control element, together with means responsive to a variation of the control voltage from a predetermined value for energizing this actuating means to actuate the control member and means actuated by the actuating means for controlling the supply of a second voltage to the voltage variation responsive means so as to cause the latter means to operate to terminate the action of the actuating means when a predetermined relationship exists between the controlling operating condition or characteristic and the supply of material.

The invention is illustrated in one form thereof as applied to controlling the supply of material through a control device in accordance with the speed of a controlling element.

Figure 1:
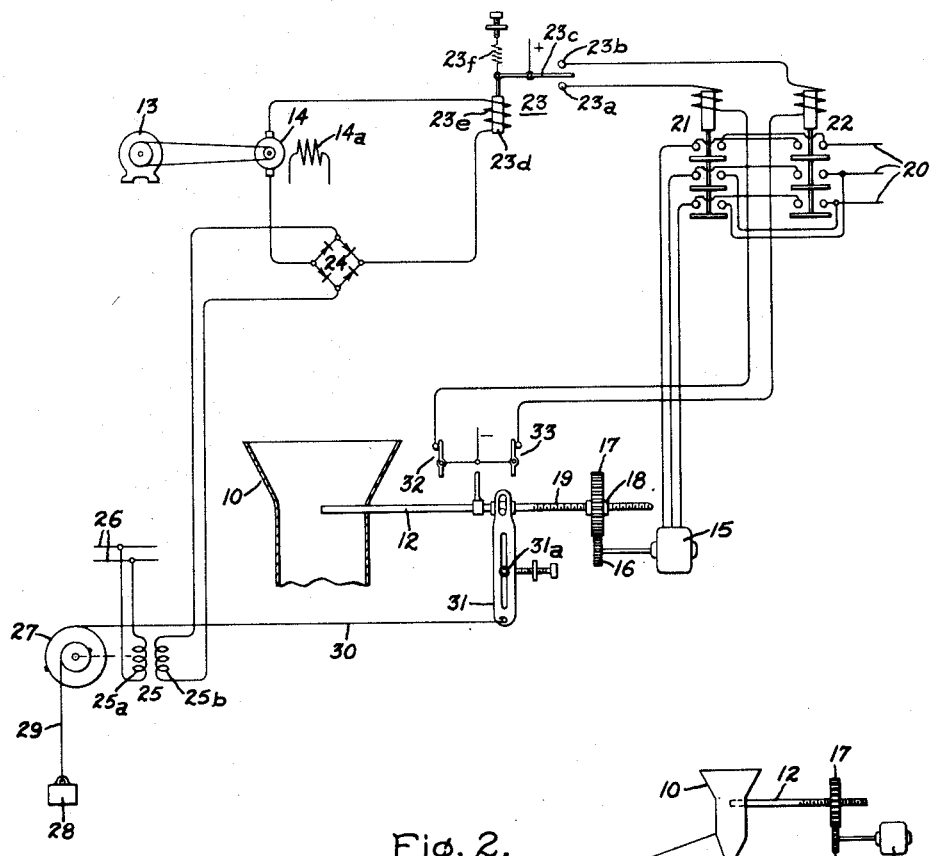
Figure 2:
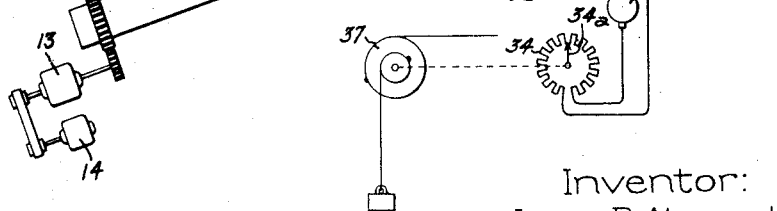
Figure 3:
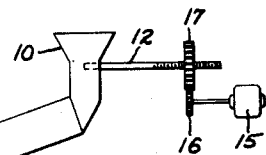

For a better and more complete understanding of the invention, reference should now be had to the following specification and to the accompanying drawing in which Fig. 1 is a simple, diagrammatical illustration of an embodiment of the invention, Fig. 2 is a simple, diagrammatical illustration of the invention in an application of the control of the orifice in the slurry feed nozzle of a rotary cement kiln and Fig. 3 is a modification.

Referring now to the drawing, the slurry feed nozzle 10 of a rotary cement kiln 11 is provided with a movable slide member 12, the position of which controls the rate of feed of slurry to the kiln. The variable slide member 12 is controlled in accordance with an operating condition or characteristic of a control element which in the application illustrated is the speed of the kiln itself. As pointed out in the foregoing, however, the control member 12 might be controlled in accordance with any other operating condition or characteristic of a control element such, for example, as the rate of feed of another material in an application in which the invention is to be utilized to control the mixture of two or more materials.

The kiln 11 is driven by suitable driving means illustrated as an electric motor 13 which is supplied from a suitable source (not shown).

Suitable means are provided for producing a control voltage varying with the speed of the kiln. The means illustrated for this purpose comprise a direct-current generator 14 provided with a field winding 14a which is supplied from a suitable source of excitation (not shown).

The generator 14 is either belted or geared to the kiln drive motor 13 so as to produce a control voltage that varies with the speed of the kiln 11.

Suitable means, illustrated as an electric pilot motor 15, are provided for actuating the movable slide control member 12 so as to vary the effective orifice of the slurry feed nozzle 10. Motor 15 carries a pinion 16 which meshes with a gear 17. Gear 17 is provided with a nut 18 which is threaded to receive a screw 19 which is connected to the variable slide control member 12 so as to advance or retract the slide member 12 depending upon the direction of rotation of motor 15.

Although motor 15 may be of any suitable type, it is illustrated as an alternating-current induction motor and is supplied from a suitable source represented in the drawing by the three supply lines 20. Suitable reversing means illustrated as a pair of electromagnetic contactors 21 and 22 are provided for connecting the motor 15 to the source 20 for rotation in either direction. It may be assumed that when contactor 21 is closed, the motor 15 is connected to the source 20 for rotation in a direction to advance the slide member 12 thereby to decrease the feed of slurry through the orifice of the nozzle 10, and that when contactor 22 is closed, motor 15 is connected to the source 20 for rotation in a direction to retract the slide member 12 thereby to increase the feed of slurry.

Means responsive to a variation of the voltage of the pilot generator 14 from a predetermined value for energizing and closing one or the other of the contactors 21, 22 are provided. These means are illustrated as an electroresponsive device, preferably in the form of a contact making voltmeter 23. As shown, contact making voltmeter 23 has a pair of stationary contacts 23a, 23b, a cooperating movable contact member 23c, a movable core member 23d, and an operating coil 23e, connected to the terminals of pilot generator 14. An adjustable spring 23f is provided for calibrating the voltmeter.

A rectifier 24 is included in the connections between the armature of the pilot generator 14 and the operating coil 23e of the contact making voltmeter. Although this rectifier may be of any suitable type, it is preferably a surface contact type rectifier such, for example, as the well-known copper oxide rectifier, and its elements are connected in the form of a Wheatstone bridge to provide fullwave rectification.

Suitable means are provided for stopping the movement of the slide member 12 when the supply of material through the slurry feed nozzle 10 has a predetermined relationship to the speed of the kiln 11. These means are illustrated as an induction voltage regulator 25 having a rotatably mounted primary winding 25a and an inductively related stationary secondary winding 25b. Primary winding 25a is supplied from a suitable source such, for example, as represented by the two supply lines 26, which may be and preferably are, one phase of the supply source 20. The secondary winding 25b is connected to the rectifier 24 so that both half waves of the secondary voltage are rectified and supplied to the operating coil 23e of the contact making voltmeter.

A pulley 27 is connected to the rotor member of the induction voltage regulator and a counterweight 28 is attached to one sheave of the pulley by means of a cord 29 so that the counterweight tends to rotate the pulley in a counterclockwise direction. The pulley is also connected by means of a cord 30 to one end of a pivoted lever 31, the opposite end of which is connected by means of a pin and slot connection to the slide member 12. As shown in the drawing, lever 31 is provided with an adjustable fulcrum 31a. The induction voltage regulator is initially adjusted so that its secondary voltage will be a low value, e. g., 10 volts when the speed of the kiln 11 is maximum and the pilot generator 14 is generating its maximum voltage, e. g., 110 volts. The connections between the secondary winding of the induction voltage regulator and the rectifier are such that the regulator voltage adds to the voltage of the generator 14. Thus, under the conditions assumed, 120 volts will be applied to the operating coil 23e of the contact making voltmeter 23, and the adjusting spring 23f will be suitably tensioned to cause the movable contact member 23c to occupy a central position between the two stationary contacts 23a, 23b.

Suitable limit switches 32, 33 are provided for deenergizing the pilot motor 15 at either limit of motion of the slide member 12.

With the foregoing understanding of the elements and their organization in the system, the operation of the system itself will readily be understood from the following detailed description. With the kiln 11 operating at maximum speed, the pilot generator 14 will be generating a maximum voltage and supplying it to the coil 23e of the contact making voltmeter. This voltage combined with the rectified secondary voltage of the induction regulator 25 is sufficient to maintain the movable contact member 23c in its neutral position between the two stationary contact members.

If the speed of the kiln is decreased an amount, for example, such that the voltage of the generator 14 is decreased from 110 to 100 volts, the movable contact member 23c will engage the stationary contact member 23a to complete an energizing circuit for the operating coil of contactor 21. In response to energization, contactor 21 closes its contacts and connects pilot motor 15 to the supply source 20 for rotation in a direction to advance the slide member 12 and thereby decrease the supply of material through the slurry feed nozzle 10. Motion of the slide member 12 will rock the lever 31 in a direction such that a rotor member of induction voltage regulator 25 will be rotated in a direction to increase the voltage supplied through the rectifier 24 to the operating coil of contact making voltmeter 23. The fulcrum of lever 31 has been previously adjusted to a position such that when the slide member 12 has been moved to a position such that the supply of material through the slurry feed nozzle 10 properly corresponds to the new speed of the kiln, a secondary voltage of the induction voltage regulator when added to the new voltage of the pilot generator 14 will be just sufficient to cause contact making voltmeter 23 to open its contacts. In other words, when the slide member 12 reaches the correct position for the new speed of the kiln, the secondary voltage of the induction voltage regulator will be increased from 10 volts to 20 volts, which added to the 100 volts of the pilot generator 14, will cause contact making voltmeter 23 to open its contacts, thereby to interrupt the energizing circuit for contactor 21. In response to deenergization, contactor 21 opens its contacts to disconnect the pilot motor 15 from the supply source, thereby stopping the motor and the movement of the slide 12.

Any further decrease in the speed of the kiln and the voltage of the pilot generator will cause a proportional movement of the slide member 12 and a proportional closing of the orifice of the slurry feed nozzle 10. If for any reason the kiln is shut down, causing the voltage of the pilot generator 14 to decrease to zero, the contact making voltmeter 23 would remain energized as described in the foregoing until opened by the limit switch 32.

The operation of the system when the speed of the kiln is increased is identical with that described in the foregoing with the exception that the top contact member 23b of the contact making voltmeter is closed owing to the increase in voltage from the pilot generator when the speed of the kiln is increased. This will cause contactor 22 to close and connect pilot motor 15 to the source 20 for rotation in a direction to retract the slide member 12 thereby to increase the supply of material through the slurry feed nozzle 10. The motion of the slide member 12 will continue until the voltage of the induction voltage regulator is reduced to the value at which the contact making voltmeter opens its contacts to deenergize the pilot motor 15.

The modified system of Fig. 3 differs from the system of Fig. 1 in that the rectifier 24 and voltage regulator 25 are replaced by a variable resistor 34 connected in circuit with the operating coil 35 of a contact making voltmeter and tachometer generator 36 which correspond to contact making voltmeter 23 and tachometer generator 14 of Fig. 1. The movable contact arm 34a of variable resistor 34 is rotated in response to rotation of pulley 37 to which it is suitably connected as illustrated in the drawing.

The remainder of the modified system of Fig. 3 is identical with the system of Fig. 1 and accordingly, description and illustration of the remaining features are omitted.

In operation, an increase in the speed of the kiln results in increasing the voltage supplied by tachometer generator to the operating coils of the contact making voltmeter. As in the system of Fig. 1 this results in withdrawing the slide of the feed nozzle 12 and increasing the rate of supply of material through the feed nozzle. This movement of the slide effects rotation of pulley 37 which, in turn, rotates the contact arm 34a of variable resistor 34 in a direction to decrease the voltage supplied to coil 35. When the slide of the feed nozzle has been withdrawn to a position at which the rate of supply of material is increased the correct amount corresponding to the increased speed of the kiln, the voltage supplied to operating coil 35 is decreased sufficiently to terminate the movement of the slide.

A decrease in the speed of the kiln decreases the voltage supplied to operating coil 35, and the contact making voltmeter responds and causes the slide to be advanced to decrease the rate of supply of material. This movement of the slide rotates pulley 37 which rotates movable contact arm 34a in a direction to increase the voltage supplied to coil 35 sufficiently to stop the movement of the slide when the rate of supply of material correctly corresponds to the reduced speed of the kiln.

Although in accordance with the provisions of the patent statutes the principle of this invention has been explained together with the best mode in which it is now contemplated applying that principle, it will be understood that the apparatus and connections shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A system for controlling the supply of a material to a rotating element comprising in combination, a control device provided with a movable control member for controlling the supply of material to said rotating element, variable speed driving means for driving said rotating element at different desired speeds, a direct current tachometer generator driven by said driving means for producing a control voltage varying in proportion to the speed of said rotating element, a reversible electric motor for moving said control member to vary the rate of supply of material to said rotating element, means responsive to a deviation of the voltage of said generator from a predetermined value for effecting the energization of said motor and for controlling its direction of rotation comprising an electromagnetic relay having its operating coil connected in circuit with said tachometer generator and reversing switching mechanism for said motor controlled by said relay, and means actuated by said motor for controlling the voltage applied to said relay coil to cause said voltage deviation responsive means to deenergize said motor when the supply of said material has a predetermined relationship to the speed of said rotating element.

2. A control system comprising in combination, a control element, a member to be controlled thereby, means actuated by said element for producing a variable D. C. control voltage, means for actuating said member, means responsive to a variation of said control voltage from a predetermined value for energizing said actuating means to actuate said member, an induction voltage regulator actuated by said actuating means for controlling the supply of a voltage to said voltage variation responsive means to cause said responsive means to deenergize said actuating means when a predetermined relationship exists between said voltages, and means for rectifying the voltage controlled by said induction voltage regulator.

3. A control system comprising in combination, a member to be controlled, a control element and a generator controlled thereby for producing a variable D. C. control voltage, a motor for moving said member, means connected to said generator and responsive to a variation of said voltage from a predetermined value for energizing said motor to move said member, a rectifier included in the connections between said generator and voltage variation responsive means, and an induction voltage regulator connected to said rectifier and actuated by said motor for controlling the supply of a voltage to said voltage deviation responsive means to cause said means to deenergize said motor when a predetermined relationship exists between said voltages.

4. A system for controlling the supply of a material to a moving element comprising in combination, variable speed driving means for driving said element at different desired speeds, a control device provided with a movable control member for controlling the supply of material to said moving element, an electric motor for actuating said member, a direct current tachometer generator driven by said driving means for generating a control voltage varying with the speed of said element, means responsive to deviation of the voltage of said generator from a predetermined value for controlling said motor to actuate said member to vary the supply of said material comprising an electroresponsive relay provided with an operating coil connected in circuit with said generator and reversing switching mechanism controlled by said relay for controlling the direction of rotation of said motor, and a variable resistor actuated by said motor for varying the voltage supplied to said relay coil to cause said relay to deenergize said motor when the supply of said material has a predetermined relationship to said generator voltage.

JAMES R. ALEXANDER.